(12) United States Patent
Stoyanov et al.

(10) Patent No.: US 10,544,698 B2
(45) Date of Patent: Jan. 28, 2020

(54) AIR SEAL ABRASIVE COATING AND METHOD

(71) Applicant: United Technologies Corporation, Farmington, CT (US)

(72) Inventors: Pantcho Stoyanov, West Hartford, CT (US); Christopher W. Strock, Kennebunk, ME (US); Agnieszka M. Wusatowska-Sarnek, Mansfield Ctr., CT (US)

(73) Assignee: United Technologies Corporation, Farmington, CT (US)

( * ) Notice: Subject to any disclaimer, the term of this patent is extended or adjusted under 35 U.S.C. 154(b) by 149 days.

(21) Appl. No.: 15/616,545

(22) Filed: Jun. 7, 2017

(65) Prior Publication Data

US 2017/0362952 A1    Dec. 21, 2017

Related U.S. Application Data

(60) Provisional application No. 62/352,162, filed on Jun. 20, 2016.

(51) Int. Cl.
*F01D 11/12* (2006.01)
*F01D 5/02* (2006.01)
(Continued)

(52) U.S. Cl.
CPC ............. *F01D 11/122* (2013.01); *F01D 5/02* (2013.01); *F01D 21/003* (2013.01); *F01D 25/24* (2013.01);
(Continued)

(58) Field of Classification Search
CPC ........ F01D 11/122; F01D 11/001; F01D 5/02; F01D 25/24; F01D 21/003;
(Continued)

(56) References Cited

U.S. PATENT DOCUMENTS 4,372,404 A    2/1983    Drake
4,774,150 A    9/1988    Amano et al.
(Continued)

FOREIGN PATENT DOCUMENTS

EP    2233600 A1    9/2010
EP    2962844 A2    1/2016

OTHER PUBLICATIONS

Extended European Search Report for EP Application No. 17176396.4, dated Dec. 1, 2017, 9 pages.
(Continued)

*Primary Examiner* — George C Jin
(74) *Attorney, Agent, or Firm* — Kinney & Lande, P.A.

(57) ABSTRACT

An embodiment of a gas turbine engine component includes an abrasive coating disposed on at least a portion of a sealing region. The abrasive coating includes an inner abrasive region disposed outward of the sealing region in a coating thickness direction, and an outer abrasive region disposed outward of the inner abrasive region in the coating thickness direction. The inner abrasive region includes abrasive particles retained in an inner matrix, and the outer abrasive region includes abrasive particles retained in an outer matrix. At least one of the inner matrix and the outer matrix is modified with a first indicator material. At least one aspect of the first indicator material corresponds to a thickness range of the abrasive coating being within the inner thickness region or the outer thickness region.

15 Claims, 6 Drawing Sheets

(51) Int. Cl.
*F01D 21/00* (2006.01)
*F01D 25/24* (2006.01)

(52) U.S. Cl.
CPC .... *F05D 2220/32* (2013.01); *F05D 2230/311* (2013.01); *F05D 2230/90* (2013.01); *F05D 2300/516* (2013.01)

(58) Field of Classification Search
CPC ......... F05D 2300/516; F05D 2230/312; F05D 2230/311; F05D 2230/90; F05D 2230/516; F05D 2200/32; Y02T 50/672
USPC .......................................................... 415/174
See application file for complete search history.

(56) References Cited

U.S. PATENT DOCUMENTS

| | | | |
|---|---|---|---|
| 5,704,759 A | 1/1998 | Draskovich et al. | |
| 6,532,656 B1 | 3/2003 | Wilkins et al. | |
| 6,725,540 B2 | 4/2004 | Bose et al. | |
| 7,096,712 B2 | 8/2006 | Feierabend et al. | |
| 7,806,410 B2 | 10/2010 | El-Aini et al. | |
| 7,922,455 B2 | 4/2011 | Itzel et al. | |
| 8,017,240 B2 | 9/2011 | Strock | |
| 8,168,289 B2 | 5/2012 | Seth et al. | |
| 8,186,946 B2 | 5/2012 | Parkos, Jr. et al. | |
| 8,807,955 B2 | 8/2014 | Wrabel et al. | |
| 8,911,205 B2 | 12/2014 | Rose et al. | |
| 9,169,740 B2 | 10/2015 | Strock et al. | |
| 9,556,743 B2 * | 1/2017 | Chamberlain | C04B 41/85 |
| 2002/0189722 A1 | 12/2002 | Hasz et al. | |
| 2003/0126800 A1 * | 7/2003 | Seth | B24D 18/00 51/293 |
| 2003/0183529 A1 | 10/2003 | Ohara et al. | |
| 2005/0129511 A1 | 6/2005 | Allen | |
| 2009/0238983 A1 | 9/2009 | Mitchell et al. | |
| 2009/0246031 A1 | 10/2009 | Rose | |
| 2013/0004328 A1 | 1/2013 | Wrabel et al. | |
| 2014/0147242 A1 | 5/2014 | Ghasripoor et al. | |
| 2016/0003066 A1 | 1/2016 | Stratton et al. | |
| 2016/0040547 A1 | 2/2016 | Clouse et al. | |
| 2016/0061047 A1 | 3/2016 | Playford et al. | |
| 2016/0305257 A1 * | 10/2016 | Strock | F04D 29/388 |
| 2017/0314570 A1 * | 11/2017 | Strock | C23C 16/00 |
| 2017/0362952 A1 * | 12/2017 | Stoyanov | F01D 5/02 |

OTHER PUBLICATIONS

Communication Pursuant to Article 94(3) EPC for European Application No. 17176396.4, dated Jul. 11, 2019, 4 pages.

* cited by examiner

AIR SEAL ABRASIVE COATING AND METHOD

CROSS-REFERENCE TO RELATED APPLICATION(S)

This application claims the benefit of U.S. Provisional Application No. 62/352,162 filed Jun. 20, 2016 for "Air Seal Abrasive Coating and Method" by Pantcho Stoyanov, Christopher W. Strock, and Agnieszka M Wusatowska-Sarnek.

BACKGROUND

The disclosed subject matter relates generally to seals for turbine engines, and more specifically to abrasive coatings usable in such seals.

Typical sealing system for turbine engines refers to rows of rotating blades or knife-edge seals within a generally cylindrical case. The rotating elements—blade tips and knife-edges—are covered with protective abrasive coating while stationary elements have a relatively abradable surface; either the substrate itself is comparably abradable, or it can be covered with sacrificial abradable coating. To form a conventional seal, one of a pair of interacting sealing regions or edges are coated with abrasive material, while the other region is provided with an abradable surface as noted above. The abradable substrate or coating material is consumed in preference to the abrasive material and performs a cutting action into the abradable. Inadvertent contact can also cause a rub event, such as rubbing from differences in thermal expansion due to insufficient warmup periods, or other transient imbalances.

While the abradable material is consumed in preference to the abrasive material, the abrasive coating can, and is intended to, be consumed over time as well. In some instances, the matrix is intended to break down to release used abrasive particles and constantly expose new and sharper particles as particles are worn down through use. In addition, hard particles can pull out of the abrasive coating during certain rub events. Rather than damage the component substrate(s) during rub, pieces of both the abradable and the abrasive coating break off to limit rub forces that would otherwise be high during interference.

Given enough time and use, the entire abrasive coating could wear away, exposing the substrate. More frequently, however, the abrasive coating is usually intended to maintain a minimum thickness for sufficient sealing and protection of the substrate/cutting edge. In the case of compressor air seals, this minimizes surge (i.e., reverse flow over airfoil tips or other cutting edges).

During maintenance, there can sometimes be enough coating thickness to last until the next maintenance interval, perhaps due to less-than-expected wear. Since it is difficult to nondestructively inspect the seal for minimum abrasive coating thickness, most often, all of the blades are sent for refurbishment and recoating at predetermined intervals. This is conventionally done regardless of whether or not they have sufficient abrasive coating thickness to be reused for another interval.

SUMMARY

An embodiment of a gas turbine engine component includes an abrasive coating disposed on at least a portion of a sealing region or edge. The abrasive coating includes a plurality of abrasive particles, an inner matrix, and an outer matrix. The inner matrix retains an inner portion of the plurality of abrasive particles, defining an inner abrasive region disposed outward of the sealing edge in a coating thickness direction. The outer matrix retains an outer portion of the plurality of abrasive particles, defining an outer abrasive region disposed outward of the inner abrasive region in the coating thickness direction. One of the inner matrix and the outer matrix is modified with a first indicator material, the first indicator material having at least one identifying aspect corresponding to being within the inner abrasive region or the outer abrasive region.

An embodiment of a method of coating a turbine engine component includes, in a coating thickness direction, applying a first portion of an abrasive coating over at least one sealing region of the component to form an inner abrasive region having an inner portion of abrasive particles retained in an inner matrix. In the coating thickness direction, a second portion of the abrasive coating is applied to form an outer abrasive region having abrasive particles retained in an outer matrix. During at least one of the applying steps, a first indicator material is incorporated into at least one of the inner matrix and the outer matrix. At least one identifying aspect of the first indicator material corresponds to a thickness range of the abrasive coating being within the inner abrasive region or the outer abrasive region.

An embodiment of a method of non-destructively inspecting an abrasive coating is disclosed. The coating includes at least one abrasive region arranged in a coating thickness direction. The method includes inspecting an exposed surface of the abrasive coating to detect presence or absence of an indicator material in a matrix portion of the exposed surface. The at least one abrasive region is determined to correspond to the presence or absence of the indicator material in the matrix portion of the exposed surface. A remaining thickness of the abrasive coating is estimated by identifying an original range of coating thicknesses of the at least one abrasive region determined to correspond to the presence or absence of the indicator material in the matrix portion of the exposed surface.

DETAILED DESCRIPTION

A matrix portion of an abrasive coating can be modified with small amounts of an indicator material which varies in at least one aspect based on thickness of the coating. Observable or identifiable aspect(s) of the indicator material, such as a ceramic composition compatible with, but distinguishable from, the base matrix composition, can provide information during maintenance or repairs to indicate maintenance events such as premature wear, or expected coating thickness. The modified abrasive can be incorporated onto a rotating part of the air seal (e.g., tip seals for shrouded or unshrouded airfoils, and labyrinth/knife edge seals) by cold spray or thermal spray techniques, among others.

Figure 1:
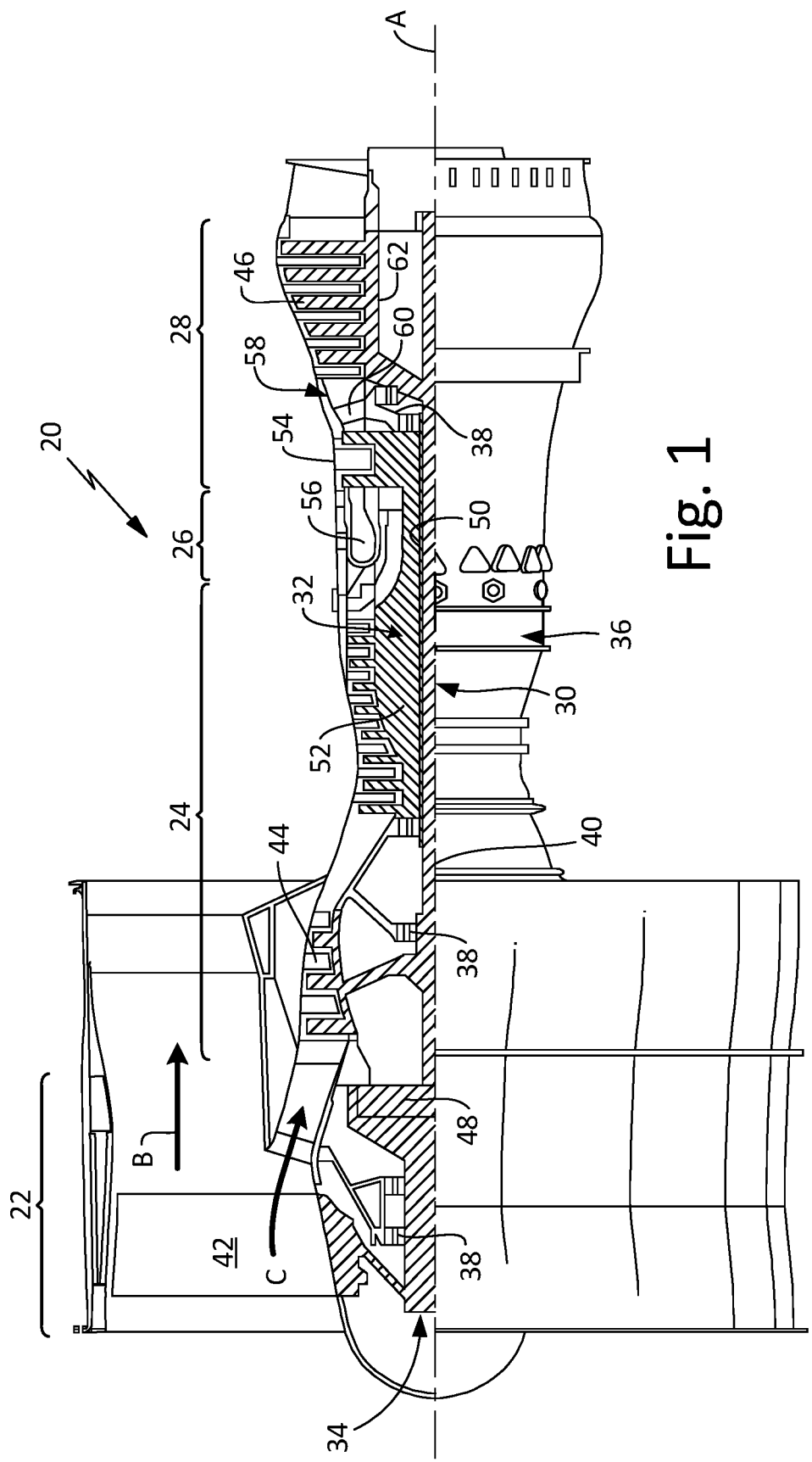
FIG. 1 schematically depicts a quarter-sectional view of a gas turbine engine.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis, and where a low spool enables a low pressure turbine to drive a fan directly, or via a gearbox, an intermediate spool that enables an intermediate pressure turbine to drive an intermediate compressor of the compressor section, and a high spool that enables a high pressure turbine to drive a high pressure compressor of the compressor section. It should also be noted that numerous elements have been exaggerated or omitted for clarity.

Engine 20 generally includes low speed spool 30 and high speed spool 32 mounted for rotation about an engine central longitudinal axis A relative to an engine static structure 36 via several bearing systems 38. Bearing systems 38 can each include one or more journal bearings with a coated lubricant surface. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 directly, or through a speed change device, such as geared architecture 48, to drive fan 42 (via fan shaft 34) at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

In one example, geared architecture 48 is an epicyclic gear train with a stationary star gear carrier and rotatable ring gear. Epicyclic gear systems are complex mechanisms for reducing or increasing rotational speeds between two rotating shafts or rotors, such as between a low speed engine shaft and a fan drive shaft.

Core airflow C is compressed by low pressure compressor 44 then high pressure compressor 52, and is mixed with fuel and ignited in combustor 56 to produce high speed exhaust gases that are then expanded through high pressure turbine 54 and low pressure turbine 46. Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 includes vanes 60, which are in the core airflow path and function as an inlet guide vane for low pressure turbine 46. Mid-turbine frame 58 further supports bearing systems 38 in turbine section 28. Utilizing vanes 60 of mid-turbine frame 58 as inlet guide vanes decreases the length of low pressure turbine 46 without increasing the axial length of mid-turbine frame 58. Reducing or eliminating the number of vanes in low pressure turbine 46 shortens the axial length of turbine section 28.

The disclosed gas turbine engine 20 in one example is a high-bypass geared aircraft engine. In a further example, gas turbine engine 20 includes a bypass ratio greater than about six (6), with an example embodiment being greater than about ten (10). In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is an industry standard parameter of pound-mass ($lb_m$) of fuel per hour being burned divided by pound-force ($lb_f$) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45. "Low corrected fan tip speed" is the actual fan tip speed in ft/sec divided by an industry standard temperature correction of $[(T_{ram} \, °R)/518.7]^{0.5}$. "Low corrected fan tip speed", as disclosed herein according to one non-limiting embodiment, is less than about 1150 ft/second.

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 62. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 62 in low pressure turbine 46 and number of blades 42 in fan section 22 disclose an example gas turbine engine 20 with increased power transfer efficiency.

Figure 2:
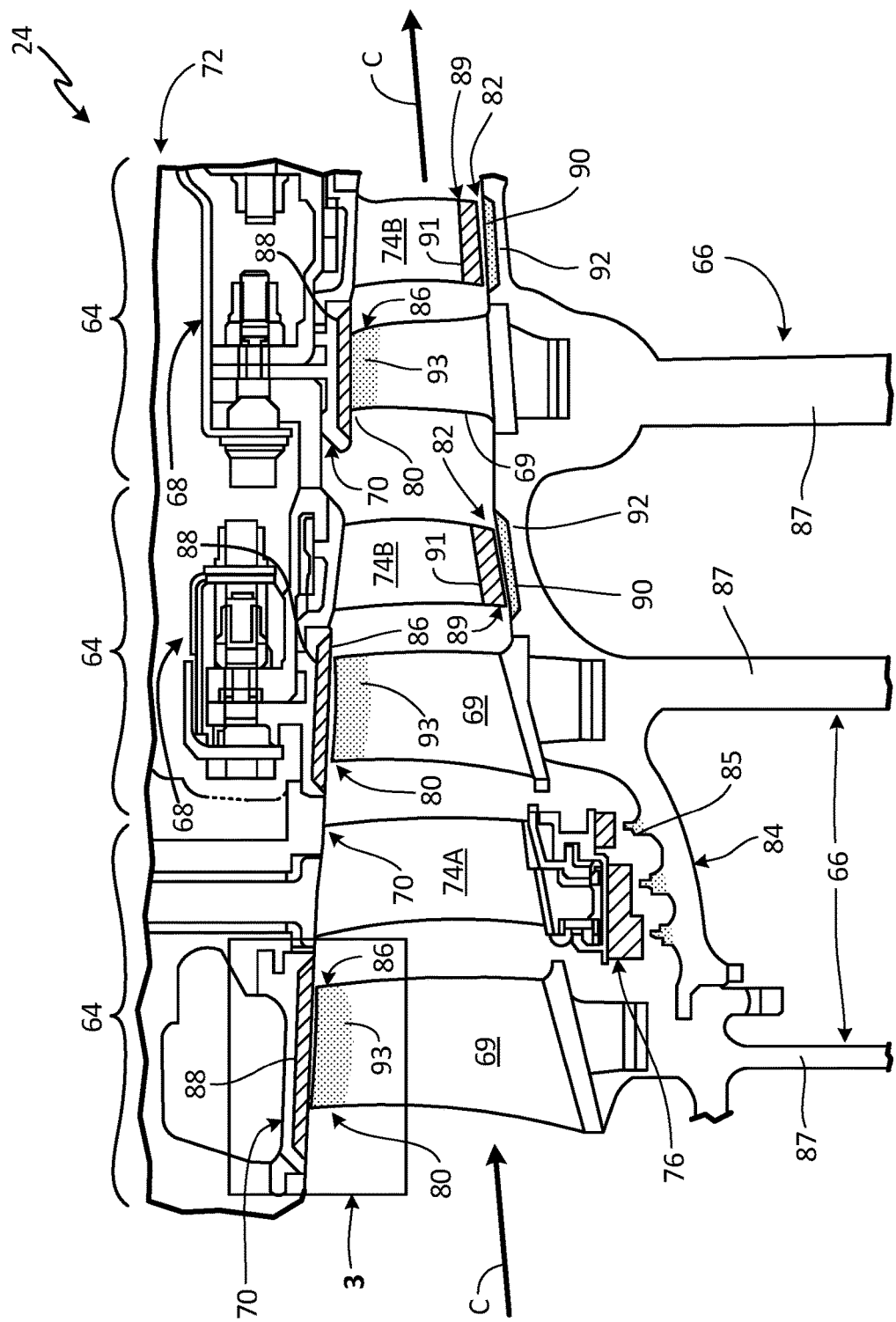
FIG. 2 is a detailed view of part of an example compressor section of a gas turbine engine, including a plurality of outer air seals, inner air seals, and a labyrinth seal.

FIG. 2 is an axial cross-section of a portion of compressor section 24, which includes multiple compressor stages where each stage 64 has a rotor assembly 66 and a respective stator assembly 68. During operation, each rotor assembly 66 rotates to cooperate with a corresponding downstream stator assembly 68 to progressively compress and direct incoming core flow C axially into subsequent stages 64 eventually reaching combustor 56 (shown in FIG. 1). Rotor assembly 66 includes blades 69 extending radially outward toward an adjacent circumferential surface such as seal ring 70 secured to outer casing 72. Stator vanes 74A, 74B are mounted circumferentially and extend radially inward from outer casing 72 toward an adjacent circumferential surface (e.g., seal support 76).

Compressor section 24 includes several components which have interacting combinations of sealing edges to form air seals to restrict flow between adjacent components while accounting for thermal expansion and contraction. Some of these seals are formed by one or more cutting edges on a sealing edge of one component which form grooves or indentations into a sealing edge of another component. To form a conventional outer or inner air seal, one of a pair of interacting sealing edges are coated with abrasive material, while the other is coated with an abradable material which wears in preference to the abrasive and the substrate. The abrasive material has a cutting action into the abradable material, but it too will eventually wear away and must occasionally be restored or refurbished. However, it is difficult to determine the remaining coating thickness with conventional abrasive coatings and application techniques.

These embodiments, by way of example only, include outer air seals 80, inner air seals 82, and labyrinth seal 84. In this example, outer air seals 80 each include at least one rotor blade 69 with an abrasively coated airfoil tip 86 interacting in sealing engagement with outer seal ring 70, which can be secured annularly around rotor disc 87. Outer abradable coating 88 is disposed radially adjacent to coated blade tips 86. In use, abrasively coated airfoil tips 86 closely approach or actually contact the annularly adjacent abradable coating 88 to restrict leakage core air flow C at the outer portions of the compressor flow path.

In this example, compressor section 24 also includes both shrouded stator vanes 74A at the upstream stages, and cantilevered vanes 74B in the higher downstream stages. An inner air seal 82 can also be formed via interaction of abrasively coated sealing edges which are adapted to interact with abradable sealing edge(s) on an adjacent part. Here, tips 89 of cantilevered vanes 74B have abradable coating 91 that is consumed in preference to abrasive coating 90 disposed on adjacent rotor lands (e.g., rotor lands 92 disposed on an adjacent rotor shaft or disk). In some additional or alternative embodiments of sealing systems, the base metal of a mating part acts as the abradable. (e.g. there may be no abradable coating.)

While higher compressor stages can include inner air seal(s) 82 to minimize leakage of core flow C, shrouded vanes 74A are mounted conventionally to outer casing 60 and inner seal support 76 at lower pressure stages, and do not require an inner air seal. Rather, shrouded vanes 74A can include a separate labyrinth seal 84 to minimize leakage of core flow C. In this example, labyrinth seal 84 has cutting portion 85 attached to rotor assembly 66. Cutting portions 85 have abrasive coatings formed onto one or more sealing edges, which form sealing engagement with corresponding sealing region(s) on seal support 76. This can include a honeycomb or other abradable surface. The particular number and distribution of inner air seals 82 and labyrinth seals 84 in an engine can be determined via needs of a particular application.

It should also be noted that abradable air seal assemblies are not limited to those in the example portion of compressor section 24 shown in FIG. 2. For example, embodiments of air seal assemblies according to the present disclosure are also useful in turbine section 28 as well as in one or more bearing systems 38 (shown in FIG. 1).

Figure 3:
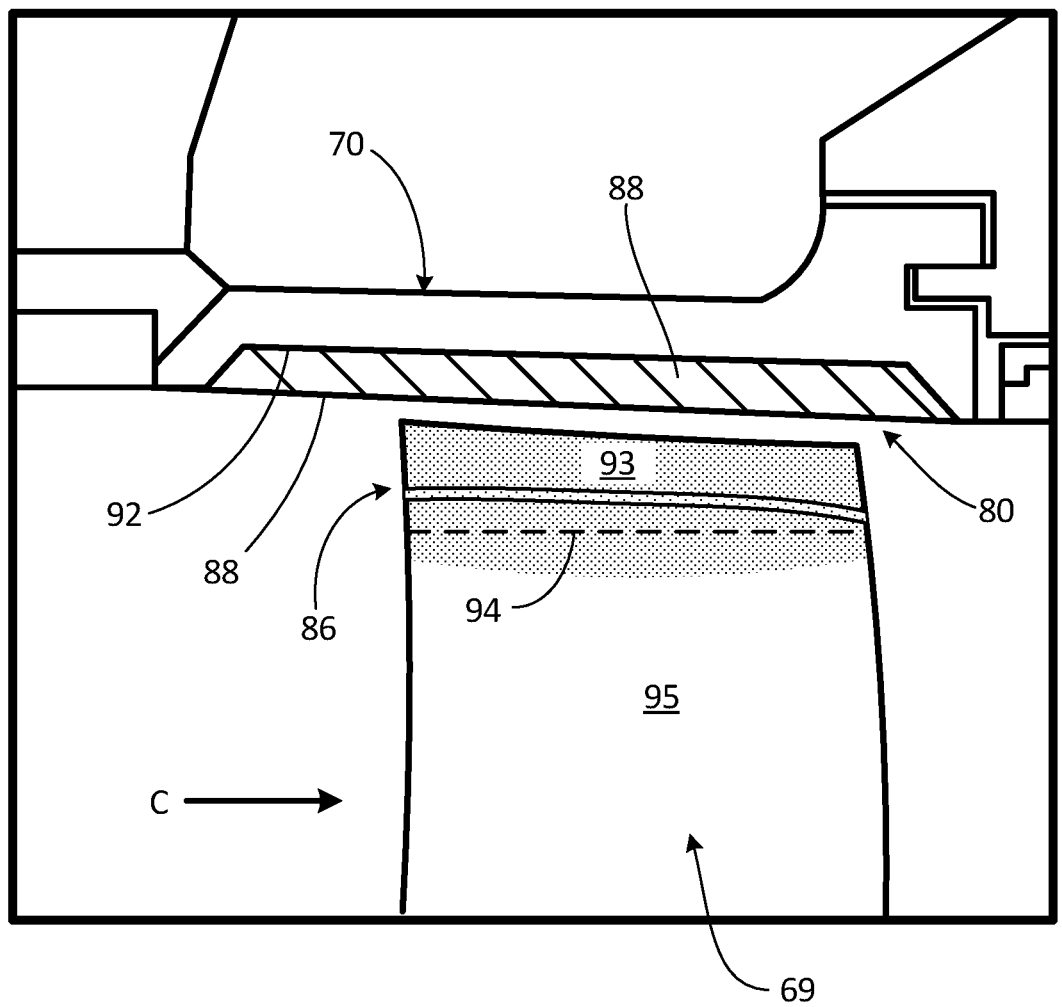
FIG. 3 is a detailed view of an outer air seal with an unshrouded rotor blade.

FIG. 3 shows one example outer air seal 80 with blade 69 and seal ring 70 for controlling reverse flow over blade 69. Each of blade 69 and seal ring 70 have at least one sealing region or edge in sealing engagement with each other to form outer air seal 80. A sealing edge of blade 69 encompasses airfoil tip 86, while a sealing region of seal ring 70 includes an inwardly facing side 92 maintained in close proximity to airfoil tip 86. Abrasive coating 93 is disposed on tip 86 and optionally over an upper portion of both airfoil sidewalls 95. The relative orientation of blade 69 and seal ring 70 accounts for varying movement and clearances of each component due to relative expansion and contraction of blade 69 and seal ring 70.

For purposes of example, FIG. 3 shows details of outer air seal 80, including the sealing relationship between rotor blade 69 with abrasive coating 93 and seal ring 70 with abradable coating 80. However, with reference to FIG. 2, several key details of the disclosure apply equally or correspondingly to inner air seal 82 and labyrinth seals 84. For example, FIG. 2 shows inner air seal 82 can also include cantilevered vanes 74B having a sealing region encompassing abradably coated vane tips 89. These interact with an abrasive coating on a corresponding sealing region or edge on an adjacent component (e.g., rotor seal land 92). In addition, labyrinth seal 84 includes multiple sealing regions or edges (e.g., knife edges) that each interact with corresponding sealing region(s) on seal support 76. A groove is formed during rotation of the rotor assembly by cutting action of the abrasive coating into the abradable surface.

When the engine is cold, newly assembled or refurbished, and has not yet been operated in a run-in mode, abrasive coating 93 on blade tips 86 will nearly touch abradable coating 80. As the engine is run in for the first time with new or refurbished abrasive coating(s) 93, the speed is quickly ramped up and down, on the order of only a few seconds per cycle, to take advantage of centrifugal expansion. Centrifugal expansion results in blades 69 being pulled spanwise, where abrasive coating 93 wears an initial groove into abradable coating 80 (or other abradable surface). When the engine is operating normally, centrifugal and thermal expansion of various components allows tips 86 to ride along a groove (not visible) in abradable coating 80, removing portions of coating 80 in the path of tips 86 to reduce interference while also minimizing clearance that would otherwise allow leakage of core flow C over blades 69. Tip clearance of blades 69 determines the degree of backflow, and is selected to minimize surge in the compressor over the expected operating range, while also minimizing frequency and magnitude of blade rubbing events that can prematurely damage one or both components during operating transients.

Abrasive coating 93 may be formed directly onto an outer tip surface 94, or onto one or more protective coatings (not shown). These coatings, such as but not limited to aluminide, may have been applied to the entirety of the airfoil during production or subsequent processing of blade 69. To better adhere abrasive coating 93 to tip 86, additional quantities of abrasive coating 93 can optionally be applied to upper surfaces of airfoil sidewall(s) 95.

Referring momentarily back to FIG. 2, inner air seal 82 is analogous in some ways to the description of outer air seal 80. While outer air seal 80 includes rotor blades 69 that include abrasive coatings on respective airfoil tips 86, in the case of inner air seal 82, the abrasive coating is on a portion of a sealing region that encompasses at least a portion of rotor land 92 facing cantilevered vane 74B. The abradable coating on vane tips 89 interacts with abrasive coating 90 on rotor land 92 as described above. Cantilevered vane tips are left uncoated in some embodiments where limited wear of the airfoil is appropriate. But a separate sacrifical abradable coating can be called for in some circumstances. For example, when left uncoated and subjected to larger rub interactions, metal may transfer from the vane tips to the rotor surface when the abrasively coated rotor lands strike uncoated metal on the tips, which can lead to large clearances and efficiency losses. Thus under such circumstances a separate sacrifical abradable coating could offer a suitable balance of performance and component life.

The abrasive coatings in question will eventually wear down to a degree after which their ability to sealingly engage complementary relatively abradable sealing regions can be compromised. With current coatings and inspection processes, it is difficult to determine the remaining thickness of abrasive coatings without damage. But with all of the example seals in FIG. 2 (outer air seals 80, inner air seals 82, and labyrinth seals 84), as well as other embodiments not explicitly described, a modified matrix material can be provided in at least a portion of the abrasive coating thickness. A matrix material can be modified with an indicator material in one or more thickness portions or layers such that the interim or remaining thickness of abrasive can be estimated or positively determined within a predetermined range in a nondestructive inspection at any point during the life of the abrasive.

Figure 4A:
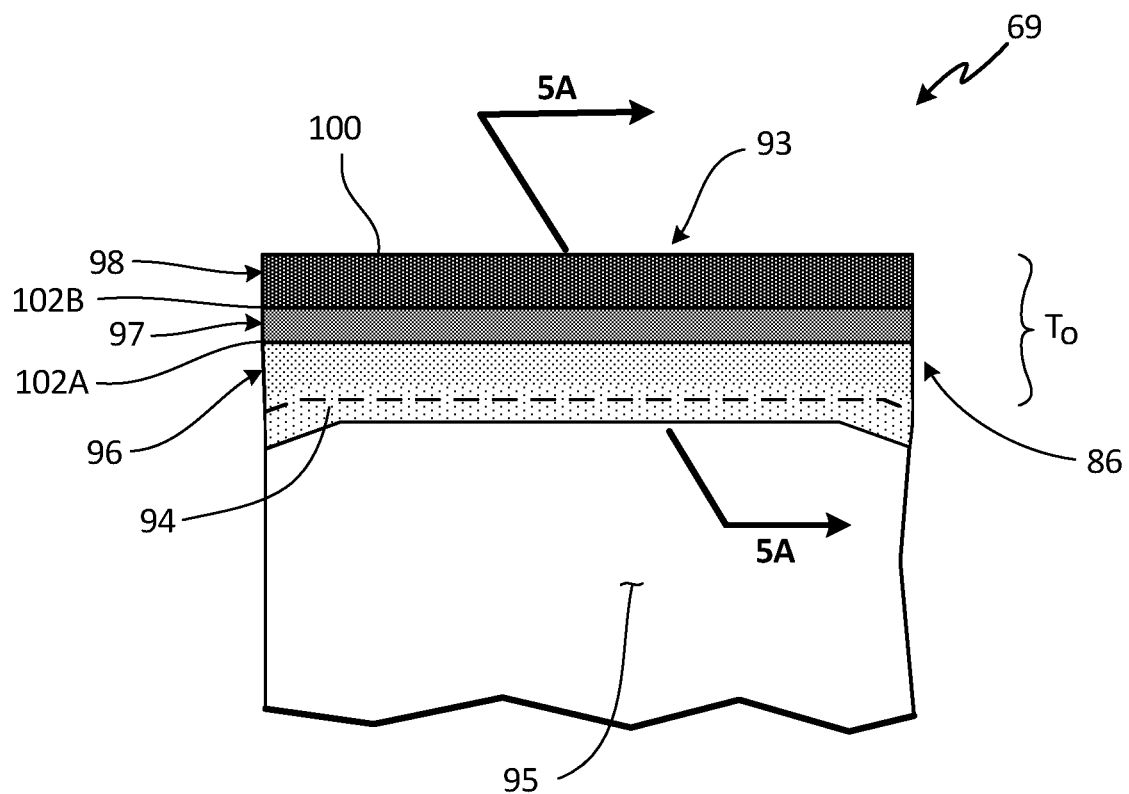
FIG. 4A shows an unshrouded airfoil tip with a newly formed abrasive coating.
Figure 4B:
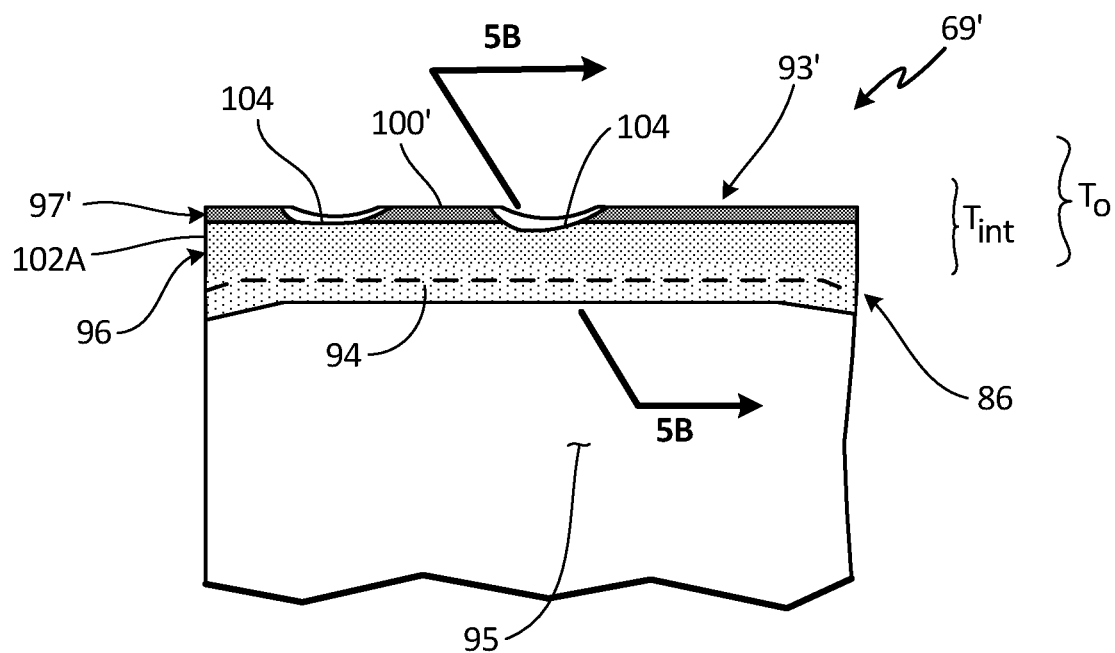
FIG. 4B is a detailed view of the unshrouded airfoil tip of FIG. 4A after a period of use.

FIG. 4A is a magnified view of the sealing edge of tip 86 shown in FIG. 3 prior to use, while FIG. 4B shows a magnified view of the same arrangement after a period of use. In the example embodiment of FIG. 4A, abrasive coating 93 is initially formed on tip 86 of blade 69 with a plurality of thickness regions. Unless otherwise specified, in the context of an airfoil tip, thickness regions and directions are described and ordered with reference to a spanwise direction of the airfoil, or a radial direction of an axial flow turbine engine. For a labyrinth seal or knife edge seal (such as on a shrouded rotor blade), the thickness direction is generally determined in a direction of the outermost cutting surface that, in the absence of the abrasive coating, would first engage and contact the opposing sealing region/abradable surface.

Generally, abrasive coating 93 includes a plurality of abrasive particles retained in a matrix. As an illustrative example only, FIG. 4A shows abrasive coating 93 as including at least inner abrasive region 96 and outer abrasive region 98, terminating at original outer surface 100. Inner abrasive region 96 can include an inner matrix retaining an inner portion of the plurality of abrasive particles, while outer abrasive region can include an outer matrix retaining an outer portion of the plurality of abrasive particles (best seen in FIGS. 6A and 6B). One or more optional intermediate abrasive regions 97 can also be disposed between inner abrasive region 96 and outer abrasive region 98, and similarly can include corresponding intermediate matrix/matrices retaining intermediate portion(s) of the abrasive particles.

Though a total of three regions are shown, it will be recognized that there can be two abrasive regions (by omitting intermediate abrasive region 97), or four or more (by splitting intermediate abrasive region 97 into multiple regions). Interfaces 102A, 102B between abrasive regions 96, 97, 98 can be discrete or graded depending on identifying properties of the corresponding modified matrix or indicator material.

Abrasive coating 93 is deposited on the blade tip or knife-edge and includes generally a composite material that includes an abrasive particulate or grit, such as cubic boron nitride (CBN), coated silicon carbide (SiC), or another hard ceramic phase. The abrasive particles, in one or more layers are embedded or retained in a matrix. A base composition of unmodified matrix can be formed from Al, Ni, or MCrAlY, where M is Ni, Co or a combination thereof.

Abrasive coating 93 can be applied to have a plurality of abrasive regions, each of which varies slightly over a particular thickness range as explained below. The matrix material in one or more of abrasive regions 96, 97, 98 can be augmented or modified with one or more indicator materials having a chemical composition different from an inner matrix chemical composition, an outer matrix chemical composition, and a substrate chemical composition. Each abrasive region is identified in several drawings by the different shading or hatching of each.

FIG. 4B shows used blade 69' with a remaining portion of used abrasive coating 93'. Some of original abrasive coating 93 (see FIG. 4A) has been consumed and/or damaged, such as through regular use as part of outer air seal 80 in a turbine engine (see FIGS. 2 and 3). Compared to the original coating thickness $T_0$ shown in FIG. 4A, all of outer abrasive region 98 and a portion of intermediate abrasive region 97 has been consumed, leaving reduced intermediate abrasive region 97', exposing interim surface 100', and resulting in a reduced or inspected total coating thickness $T_{int}$. Abrasive coating 93' can also include indentations 104 in interim surface 100'. Some indentations 104 can extend partially into intermediate abrasive region 97 and in some instances into inner abrasive region 96. Indentations 104 could correspond to a transient damage event such as excessive rubbing or foreign object ingestion.

At least one measurable or visible aspect of the indicator material in each matrix can correspond to which abrasive region (here, abrasive regions 96, 97, 98) is currently exposed at interim surface 100'. Thus if one or more measurable aspects of the modified matrix material or indicator material are made to vary along the thickness dimension of the abrasive coating, this allows the current or interim thickness to be nondestructively estimated at any point during the life of the abrasive coating.

Non-limiting examples of a chemical composition for one or more indicator materials can include $CaWO_4$, metal oxides such as $Eu_2O_3$ or others, metal-doped yttria stabilized zirconia (YSZ), and combinations thereof. The YSZ can be doped with a rare earth metal, such as Sm, Er, and/or Eu. One or more indicators can be deposited at, but not limited to, a rate of 5-20 vol % of the matrix in selected abrasive regions (e.g., 96, 97, and/or 98). In one non-limiting example a plurality of 10-25 micron $CaWO_4$ particles are added to the matrix before or during application of the selected abrasive region(s). For example, outer abrasive region 98 can correspond to a thickness range of the upper 25% of the original coating thickness $T_0$. The matrix in inner abrasive region 96 (and in optional intermediate abrasive region 97) can be modified with a different indicator (producing a different visual indication), or the matrix for some or all of the remaining inner 75% thickness range can be unmodified. When the outer 25% thickness range (corresponding to outer abrasive region 98) is worn through, it will be evident upon inspection (e.g., with application of UV or X-ray radiation), that the remaining thickness is up to 75% of the total or original coating thickness.

The degree of granularity provided to the indicator material and/or modified matrix material can correspond to a similar granularity in the estimated coating thickness. But even with only two or three abrasive regions such as in the illustrative examples shown herein, the coating thickness can be estimated to a degree sufficient to inform decisions about whether or not to reuse, repair, refurbish, or even recycle the component, so long as each abrasive region is tied or otherwise corresponds to meaningful thresholds or ranges. In the following example, the abrasive regions, and the interfaces therebetween, provide information related to the current thickness, including whether or not the abrasive coating can be expected to last through another maintenance interval.

In one non-limiting example, the matrix of inner abrasive region 96 can be modified with a first indicator material, while the matrix of intermediate abrasive region 97 is modified with a second indicator material, and the matrix of outer abrasive region 98 is provided with a third indicator material. Each of the indicator materials (see FIGS. 6A-6B for more details) may have the same or different composition in each abrasive region 96, 97, 98. If the same composition is used in more than one of these abrasive regions, some other aspect of the indicator material such as concentration or planar location in the respective matrix can be varied during production of coating 93.

Additionally or alternatively, one or more matrices can remain unmodified by an indicator material, so that one such indicating aspect of the matrix can include the mere presence or absence of a particular indicator material. Even if less than all of the abrasive regions are modified with an indicator material, the mere presence or absence of any particular indicator material on one or more exposed surfaces of the abrasive coating matrix can provide relevant information in a nondestructive manner.

Modifying the example of FIGS. 4A and 4B, presume that intermediate abrasive region 97 is omitted during production (coating 93 includes only inner abrasive region 96 and outer abrasive region 98). If a single indicator material is only used to modify the matrix of the inner abrasive region, the interim or current thickness can be determined to fall within the predetermined thickness range corresponding to the inner or outer abrasive region based on whether or not the indicator material is detectable on interim surface 100'.

One may not want or need the indicator material to be detectable with exposure to visible wavelengths alone. As part of maintenance inspections, the blade tips can be inspected for damage such as cracks. X-ray methods are often used to identify whether cracks are severe enough, regardless of remaining abrasive thickness, to warrant repair, refurbishment, or replacement of the coating or the entire component. Thus the indicator material can itself be responsive to X-ray or other energy outside the visible spectrum, such that the indicator and/or the modified matrix would emit visible or otherwise readily detectable emission or reflection (e.g., X-ray, ultraviolet or infrared). Seals, including abrasive coatings, can also be opportunistically inspected during downtime for an unrelated maintenance or repair event.

Figure 5A:
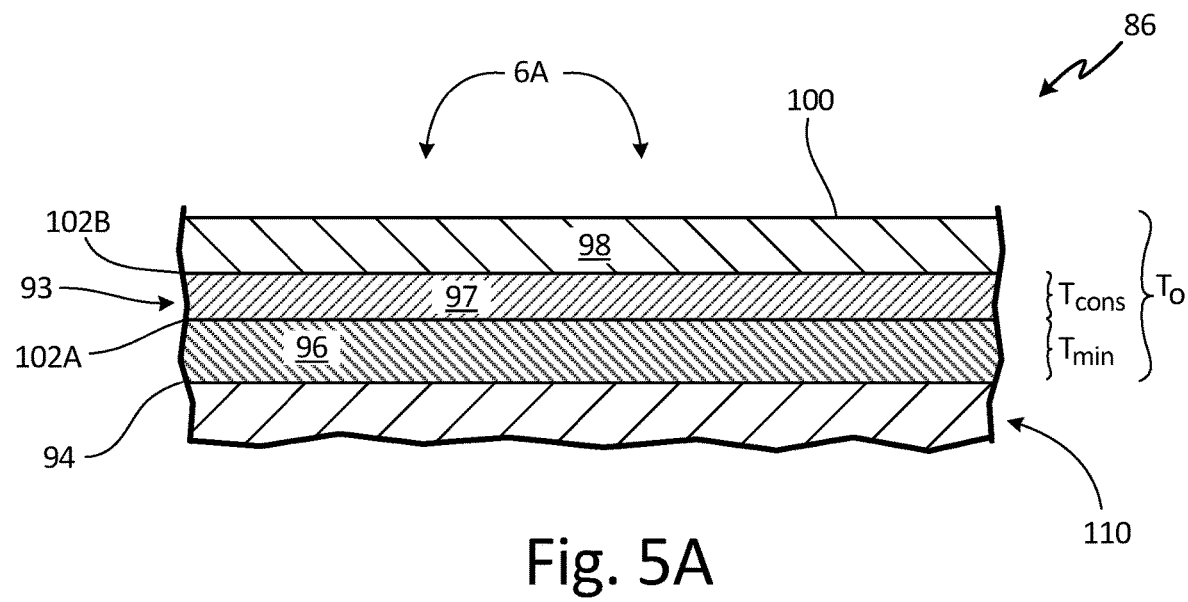
FIG. 5A shows a sectional view of the unshrouded airfoil tip and abrasive coating of FIG. 4A.
Figure 5B:
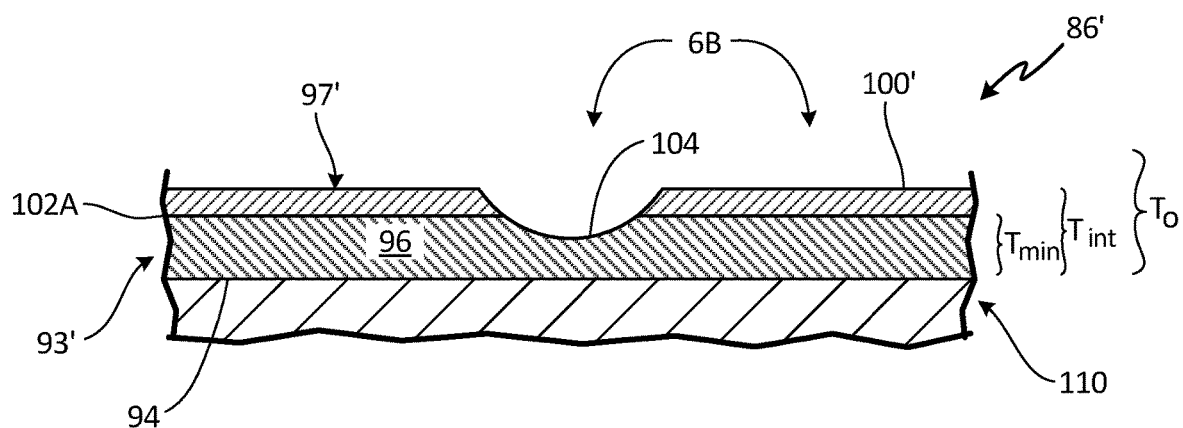
FIG. 5B is a sectional view of the unshrouded airfoil tip and abrasive coating of FIG. 4B.

FIG. 5A is a sectional view taken across line 5A-5A of FIG. 4A, while FIG. 5B is a sectional view taken across line 5B-5B of FIG. 4B. The sectional views of FIGS. 5A and 5B provide insight into a suitable production process, as well as features related to identifying coating consumption without a destructive inspection, the results of which can be used to inform further action. Referring first to FIG. 5A, inner abrasive region 96 is applied (e.g., cold sprayed or thermal sprayed) onto or adjacent to a sealing region or edge of substrate 110 (e.g., airfoil tip 86 shown in FIGS. 2-4B). Here, inner abrasive region 96 can be directly applied on the substrate of outer tip surface 94, or onto one or more protective coatings (such as but not limited to aluminide) previously applied to the entirety of the airfoil. Abrasive coating 93 can optionally be applied onto adjacent portions one or both airfoil sidewalls 95 (shown in FIG. 3) as well.

Outer abrasive region 98 can be applied (e.g., via cold spray or thermal spray) onto or adjacent to a sealing region of inner abrasive region 96. As noted above, intermediate abrasive region 97 is optional, and can be omitted. When included, intermediate abrasive region 97 can be formed as a single region as shown, or split into multiple layers. It can also be infinitesimally graded. If included, one or more intermediate abrasive regions 97 can be applied onto inner abrasive region 96, followed by outer abrasive region 98 being applied onto intermediate abrasive region(s) 97.

Abrasive coating 93 can be added any time after the airfoil tips 86 are formed. The composition of the matrix includes a base composition. For compressor section 24, abrasive coating 93 can include, for example, a single layer or multiple layers of cubic boron nitride (cBN) particles in a base nickel matrix, while the blade or vane substrate can be a titanium alloy such as Ti-6Al-4V. Blades and vanes in higher compression stages or in the turbine may require a more temperature resistant airfoil substrate like nickel alloys, and/or more resilient particulates in the abrasive coating. Metallic fan blades can include titanium- or aluminum-based alloys. Ceramic matrix or metal matrix composite fan blades are also used in some applications. Either metallic or composite fan blades can include an abrasive tip coating including alumina ($Al_2O_3$) particulates in an aluminum matrix. Applying abrasive coating 93 by a spray process allows most or all of the abrasive regions 96, 97, 98 to have a uniquely modified matrix. An indicator material is added to the matrix to uniquely modify all, or all but one, of abrasive regions 96, 97, 98 as noted above.

The varying matrix compositions are again delineated by interfaces 102A, 102B. Locations of interfaces 102A, 102B can be selected to correspond to a known total thickness of coating 93. In certain embodiments, a location of each interface 102A, 102B can correspond to various thickness thresholds related to inspection or quality control. For example, in certain of these embodiments, interface 102A can correspond to an absolute minimum acceptable thickness $T_{min}$, and the distance between interfaces 102A and 102B (i.e., original thickness of intermediate region 97) can correspond to expected coating consumption $T_{cons}$ during a typical maintenance interval. The suitable reuse thickness of coating 93' thus corresponds to a combination of minimum thickness $T_{min}$ and expected wear thickness $T_{cons}$ over an operating or maintenance interval. In other words, interface 102B can be disposed at approximately a suitable reuse thickness $(T_{min}+T_{cons})$ above substrate 110.

In certain alternative embodiments, interfaces 102A, 102B can be equally spaced. For example, in these alternative embodiments, interface 102A can correspond to approximately ⅓ of the total original thickness $T_0$ (i.e., $T_0/3$), and interface 102B can correspond to about ⅔ of the total original thickness $T_0$ (i.e., $2*T_0/3$). With any of these modes, tolerance and process limitations may not allow precise delineation of interfaces 102A, 102B but nevertheless, they can provide useful information during a non-destructive inspection as described below.

When only two abrasive regions are provided (e.g., by omission of intermediate region 97), interfaces 102A, 102B can be a single interface, and this can be positioned at a midpoint or other location. For example, the single interface can be determined to be at or above a level where the coating thickness can be expected remain above $T_{min}$ over the next interval (e.g., a suitable total reuse thickness). In certain embodiments, the single interface (or an uppermost interface 102B) can be disposed at or about 75% of total original thickness (i.e., $3*T_0/4$). In such an instance, one or more indicating aspects of the matrix on exposed surface 100' can provide information as to whether or not the matrix has worn below this interface at or about the known percentage (e.g., 75%) of total original thickness. If above the particular interface, one can identify exposed surface 100' as being part of an outer abrasive region (e.g., outer abrasive region 98 in FIG. 5A), and in turn, determine that the remaining abrasive thickness is sufficient.

As mentioned previously, the presence or absence of one or more aspects of indicator material in each matrix can be activated or enhanced by exposure to X-ray or other energy during a non-destructive inspection. This can be seen by comparing FIG. 6A, which shows original outer abrasive coating surface 100, and FIG. 6B, which shows interim or exposed abrasive coating surface 100'.

Figure 6A:
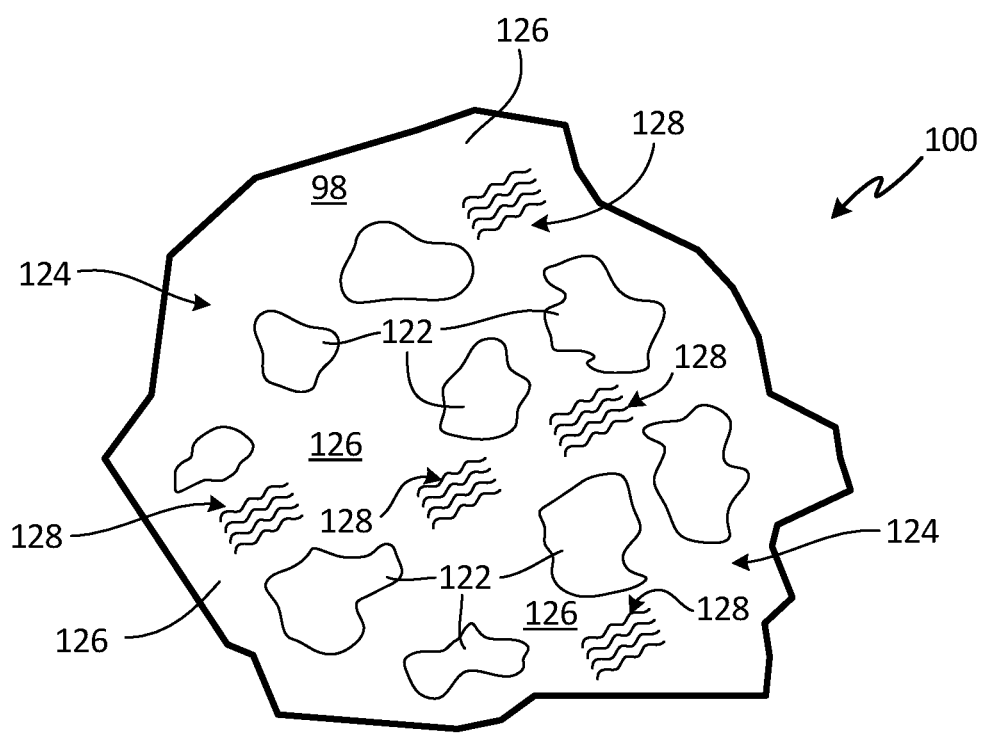
FIG. 6A shows an exposed upper surface of the abrasive coating of FIG. 4A.

In FIG. 6A, original abrasive coating outer surface 100 includes abrasive particles 122 and outer matrix 124. Referring back to FIGS. 4A and 5A, original abrasive coating outer surface 100 is part of outer abrasive region 98 of original abrasive coating 93. Again, it should be emphasized that original abrasive coating 93 can be a coating newly applied to either a new blade or restored/refurbished blade. It can also include a coating restored to an original or newly determined thickness. Abrasive particles 122 can be disposed in one or more layers so that they are retained in a single or multiple abrasive regions.

Outer matrix 124 includes at least a base outer matrix material 126 suitable for its particular application (e.g., outer air seal 80, inner air seal 82, labyrinth seal 84 or another cutting and sealing use). Base matrix material 126 can include, for example, substantially pure nickel or substantially pure aluminum, depending on the desired thermal and mechanical properties, as well as the composition of particles 122. Base outer matrix material 126 can also be modified with first indicator material 128, which can be retained evenly throughout outer matrix material 126, or concentrated in one or more discrete planar locations.

Figure 6B:
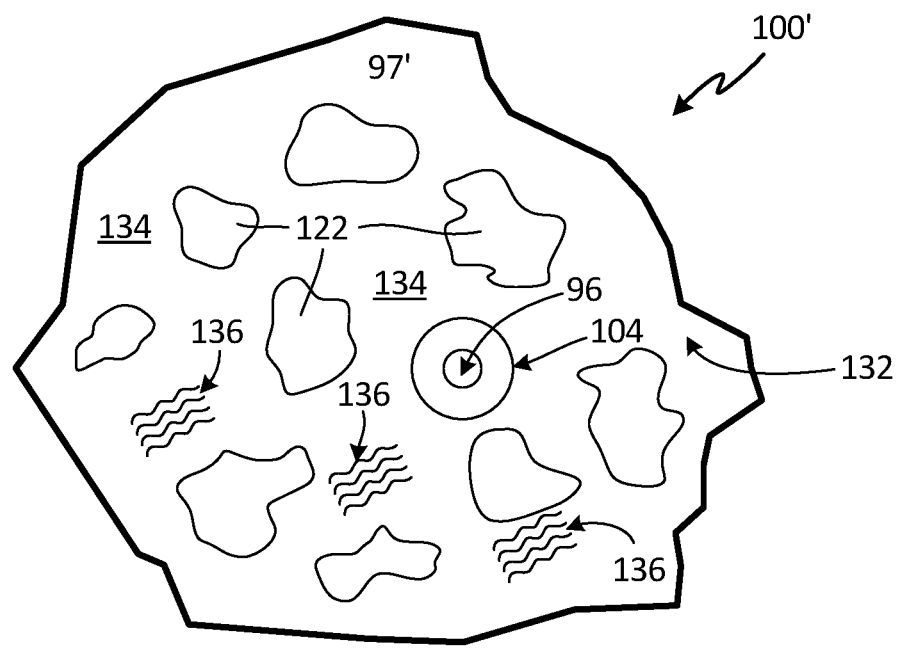
FIG. 6B shows an exposed upper surface of the abrasive coating of FIG. 4B.

In FIG. 6B, exposed interim surface 100' of used coating 93' shows abrasive particles 122 in intermediate matrix 132. Intermediate matrix 132 includes base intermediate matrix material 134, and intermediate indicator material 136, which can be retained evenly or throughout intermediate matrix material 134, or concentrated in one or more discrete planar locations. Base intermediate matrix material 134 can be essentially the same composition as base outer matrix material 126 for compatibility and consistent performance, but considerations outside the scope of this disclosure may indicate use of a different composition for each base matrix material 126, 134.

Observing or detecting the presence of the aspect(s) of outer indicator material 128 (e.g., FIG. 6A) indicates that at least a portion of outer abrasive region 98 remains, and is not yet fully consumed. Observing or detecting the presence of the aspect(s) of intermediate indicator material 136 indicates that total thickness has dropped below threshold 102B (shown in FIGS. 4A-5B) but that at least a portion of intermediate abrasive region 97 remains, and is not yet fully consumed. This indicates that the remaining thickness $T_{int}$ is somewhere between the known or predetermined thickness ranges represented by thresholds 102A, 102B.

As mentioned above, the composition of the matrix can vary in different layers. Indicator layer(s) can also vary in composition in different parts of the engine so that in different sections of the engine, one can track back the particle to its original location. Particles can be found by inspecting sections of the turbine engine where particulate may accumulate (e.g. filters, turbine cooling passages, etc) for 'marked' debris particles that might have originated from this coated surface.

Here, interim surface 100' is shown as being mostly within intermediate abrasive region 97. FIG. 6B also shows indentations 104 in coating 93', one of which extends below threshold 102A into inner abrasive region 96, which can also includes abrasive particles in an inner matrix (not visible). The inner matrix can include a base inner matrix material and an optional indicator material, which can be retained evenly or unevenly throughout.

In the absence of indentations 104, reference to FIG. 5B indicates that the remaining coating thickness $T_{int}$ would be less than the suitable reuse thickness ($T_{min}+T_{cons}$). Though one could not expect abrasive coating 93' to be sufficient to last until the next scheduled maintenance event without falling below minimum thickness $T_{min}$ the nature of indentations 104 may be such that the abrasive coating could not be restored to the original thickness $T_0$ (shown in FIGS. 4A and 5A) despite the remaining interim thickness $T_{int}$ of coating 93'. For example, indentations 104 could be of a sufficient area and/or depth that substrate 110 could be compromised. Alternatively, if interim surface 100' is opportunistically inspected during an unscheduled inspection, the remaining coating thickness $T_{int}$ could still be deemed sufficient depending on the remaining interval until the next scheduled maintenance event.

As mentioned previously, the presence or absence of one or more aspects of an indicator material in the matrix can be activated or enhanced by exposure to X-ray or other energy during a non-destructive inspection. As an additional or alternative mode of inspection, the indicator materials 128, 136 can be the same composition, but one or more of indicator materials 128, 136 can vary in concentration and/or planar locations of each abrasive region. For example, FIG. 6A shows five discrete locations for concentration of outer indicator material 128 in outer matrix 122, while FIG. 6B shows three discrete locations for concentration of intermediate indicator material 136 in intermediate abrasive region 97. Some of these planar locations may be common to both regions 97, 98, for example, as a control. However, additional planar locations can be selected to be specific to one particular abrasive region 96, 97, 98.

Though shown as constant, the size and/or composition of abrasive particles 122 can vary within or according to their disposition in either abrasive region 96, 97, or 98, in addition to the matrix compositions in each region which are modified with one or more indicator materials.

The presence of one or more layers of indicator material can be used to enhance the cutting and wear resistance performance of the coating in addition to the benefit of visual inspection capability. In particular, this can be achieved by using ceramic-based indicators in a multi-layer fashion with two or more layers with a thickness ranging between a few nanometers to millimeters.

Discussion of Possible Embodiments

The following are non-exclusive descriptions of possible embodiments of the present invention.

An embodiment of a gas turbine engine component includes an abrasive coating disposed on at least a portion of a sealing region or edge. The abrasive coating includes a plurality of abrasive particles, an inner matrix, and an outer matrix. The inner matrix retains an inner portion of the plurality of abrasive particles, defining an inner abrasive region disposed outward of the sealing edge in a coating thickness direction. The outer matrix retains an outer portion of the plurality of abrasive particles, defining an outer abrasive region disposed outward of the inner abrasive region in the coating thickness direction. One of the inner matrix and the outer matrix is modified with a first indicator material, the first indicator material having at least one identifying aspect corresponding to being within the inner abrasive region or the outer abrasive region.

The component of the preceding paragraph can optionally include, additionally and/or alternatively, any one or more of the following features, configurations and/or additional components:

A component for a gas turbine engine according to an exemplary embodiment of this disclosure, among other possible things includes a sealing region or edge; and an abrasive coating disposed on at least a portion of the sealing region or edge, the abrasive coating comprising: a plurality of abrasive particles; n an inner matrix retaining an inner portion of the plurality of abrasive particles, defining an inner abrasive region disposed outward of the sealing edge in a coating thickness direction; and an outer matrix retaining an outer portion of the plurality of abrasive particles, defining an outer abrasive region disposed outward of the inner abrasive region in the coating thickness direction; one of the inner matrix and the outer matrix modified with a first indicator material, the first indicator material having at least one identifying aspect corresponding to being within the inner abrasive region or the outer abrasive region.

A further embodiment of the foregoing component, wherein the first indicator material has a chemical composition different from an inner matrix chemical composition and an outer matrix chemical composition.

A further embodiment of any of the foregoing components, wherein the chemical composition of the first indicator material is selected from a group consisting of: CaWO4, at least one metal oxide including Eu2O3, yttria stabilized zirconia (YSZ) doped with at least one rare earth metal, and combinations thereof.

A further embodiment of any of the foregoing components, wherein the first indicator material is present only in the inner matrix or the outer matrix such that presence or absence of the first indicator material on an exposed surface of the first abrasive coating corresponds to the exposed surface being within the inner abrasive region or the outer abrasive region, each abrasive region in turn corresponding to a predetermined thickness range of the first abrasive coating.

A further embodiment of any of the foregoing components, wherein the first indicator material is concentrated at a first plurality of planar locations in the inner abrasive region, and the first indicator material is concentrated at a second plurality of discrete planar locations in the outer abrasive region, at least one of the second plurality of discrete planar locations different from the first plurality of discrete planar locations, or vice versa.

A further embodiment of any of the foregoing components, wherein the at least one aspect of the first indicator material is identifiable upon exposure of the abrasive coating to energy having at least one wavelength outside of the spectrum of visible wavelengths.

A further embodiment of any of the foregoing components, wherein at least one of the inner matrix chemical composition and the outer matrix chemical composition comprises a base matrix material selected from substantially pure nickel, substantially pure aluminum, or MCrAlY where M is nickel, cobalt, or a combination thereof.

A further embodiment of any of the foregoing components, wherein the abrasive coating further comprises: an intermediate matrix retaining an intermediate portion of the plurality of abrasive particles, defining at least one intermediate abrasive region between the inner and outer abrasive regions; wherein the intermediate matrix is modified with a second indicator material, at least one identifying aspect of the second indicator material corresponding to an exposed surface of the abrasive coating being within the intermediate abrasive region.

A further embodiment of any of the foregoing components, wherein the component is rotatable about a longitudinal axis of the gas turbine engine.

A further embodiment of any of the foregoing components, wherein the component is selected from a group consisting of: an unshrouded airfoil tip, a shroud for a rotor blade, an inner air seal land for a rotor disk, and a knife edge portion of a labyrinth seal.

A further embodiment of any of the foregoing components, wherein the plurality of abrasive particles comprises cubic boron nitride (cBN) particles, alumina ($Al_2O_3$) particles, or combinations thereof.

An embodiment of an air seal includes a gas turbine engine component according to any of the foregoing embodiments, wherein the gas turbine engine component is rotatable relative to an engine axis; and a complementary stationary turbine engine component, including an abradable surface disposed on at least a portion of a corresponding sealing region or edge for sealing engagement with the sealing region or edge of the rotatable turbine engine component.

An embodiment of a method of coating a turbine engine component includes, in a coating thickness direction, applying a first portion of an abrasive coating over at least one sealing region of the component to form an inner abrasive region having abrasive particles retained in an inner matrix. In the coating thickness direction, a second portion of the abrasive coating is applied to form an outer abrasive region having abrasive particles retained in an outer matrix. During at least one of the applying steps, a first indicator material is incorporated into a portion of at least one of the inner matrix and the outer matrix. At least one identifying aspect of the first indicator material correspond to a thickness range of the abrasive coating.

The method of the preceding paragraph can optionally include, additionally and/or alternatively, any one or more of the following features, configurations and/or additional components:

A method according to an exemplary embodiment of this disclosure, among other possible things includes, in a coating thickness direction, applying a first portion of an abrasive coating over at least one sealing region of the component to form an inner abrasive region having abrasive particles retained in an inner matrix; in the coating thickness direction, applying a second portion of the abrasive coating over the first portion of the abrasive coating to form an outer abrasive region having abrasive particles retained in an outer matrix; during at least one of the applying steps, a first indicator material is incorporated into a portion of at least one of the inner matrix and the outer matrix, at least one identifying aspect of the first indicator material corresponding to a thickness range of the abrasive coating being within the inner abrasive region or the outer abrasive region.

A further embodiment of the foregoing method, wherein the first indicator material has a chemical composition different from an inner matrix chemical composition, and an outer matrix chemical composition.

A further embodiment of any of the foregoing methods, wherein the step of incorporating the first indicator material is performed during only one of the applying steps such that presence or absence of the first indicator material on an exposed surface of the abrasive coating corresponds to the thickness range of the abrasive coating.

A further embodiment of any of the foregoing methods, wherein the first indicator material is incorporated at a first plurality of discrete planar locations in the inner abrasive region and at a second plurality of discrete planar locations in the outer abrasive region, at least one of the second plurality of discrete planar locations different from the first plurality of discrete planar locations, or vice versa.

A further embodiment of any of the foregoing methods and further comprising: prior to applying the outer abrasive portion, applying at least one intermediate abrasive portion over the inner applied abrasive portion to form at least one intermediate abrasive region.

A further embodiment of any of the foregoing methods, and further comprising: modifying the intermediate matrix with a second indicator material, at least one aspect of the second indicator material corresponding to a thickness range of the abrasive coating being within the intermediate abrasive region.

A further embodiment of any of the foregoing methods, and further comprising: during at least one of the applying steps, incorporating a third indicator material into a portion of the other of the inner matrix and the outer matrix, at least one aspect of the third indicator material corresponding to a thickness range of the abrasive coating being within the other of the inner abrasive region and the outer abrasive region.

A further embodiment of any of the foregoing methods, wherein at least one of the applying steps includes a cold spray process or a thermal spray process.

An embodiment of a method of non-destructively inspecting an abrasive coating is disclosed. The coating includes at least one abrasive region arranged in a coating thickness direction. The method includes inspecting an exposed surface of the abrasive coating to detect presence or absence of an indicator material in a matrix portion of the exposed surface. The at least one abrasive region is determined to correspond to the presence or absence of the indicator material in the matrix portion of the exposed surface. A remaining thickness of the abrasive coating is estimated by identifying an original range of coating thicknesses of the at least one abrasive region determined to correspond to the presence or absence of the indicator material in the matrix portion of the exposed surface.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine component comprising:
   a sealing region or edge; and
   an abrasive coating disposed on at least a portion of the sealing region or edge, the abrasive coating comprising:
   a plurality of abrasive particles;
   an inner matrix retaining an inner portion of the plurality of abrasive particles, defining an inner abrasive region disposed outward of the sealing edge in a coating thickness direction; and
   an outer matrix retaining an outer portion of the plurality of abrasive particles, defining an outer abrasive region disposed outward of the inner abrasive region in the coating thickness direction;
   one of the inner matrix and the outer matrix modified with a first indicator material, the first indicator material having at least one identifying aspect corresponding to a thickness range of the abrasive coating being within the inner abrasive region or the outer abrasive region;
   wherein the first indicator material has a chemical composition different from an inner matrix chemical composition, and an outer matrix chemical composition; and
   wherein the first indicator material has a first concentration range in the inner abrasive region, and the first indicator material has a second concentration range in the outer abrasive region, the first concentration range different from the second concentration range such that inspecting an exposed abrasive surface during a useful life of the abrasive coating for the at least one identifying aspect indicates whether the exposed abrasive surface is within the inner abrasive region or the outer abrasive region.

2. The component of claim 1, wherein the chemical composition of the first indicator material is selected from a group consisting of: $CaWO_4$, at least one metal oxide including $Eu_2O_3$, yttria stabilized zirconia (YSZ) doped with at least one rare earth metal, and combinations thereof.

3. The component of claim 1, wherein the first indicator material is present only in the inner matrix or the outer matrix such that presence or absence of the first indicator material on the exposed surface of the abrasive coating corresponds to the exposed surface being within the inner abrasive region or the outer abrasive region, each abrasive region in turn corresponding to a predetermined thickness range of the abrasive coating.

4. The component of claim 1, wherein the at least one aspect of the first indicator material is identifiable upon exposure of the abrasive coating to energy having at least one wavelength outside of the spectrum of visible wavelengths.

5. The component of claim 1, wherein at least one of the inner matrix chemical composition and the outer matrix chemical composition comprises a base matrix material selected from substantially pure nickel or substantially pure aluminum.

6. The component of claim 1, wherein the abrasive coating further comprises:
an intermediate matrix retaining an intermediate portion of the plurality of abrasive particles, defining at least one intermediate abrasive region between the inner and outer abrasive regions;
wherein the intermediate matrix is modified with either a second indicator material or a third, different concentration of the first indicator material, at least one identifying aspect of the first or second indicator material corresponding to an exposed surface of the abrasive coating being within the intermediate abrasive region.

7. The component of claim 1, wherein the component is rotatable about a longitudinal axis of the gas turbine engine.

8. The component of claim 7, wherein the component is selected from a group consisting of: an unshrouded airfoil tip, a shroud for a rotor blade, an inner air seal land for a rotor disk, and a knife edge portion of a labyrinth seal.

9. The component of claim 1, wherein the plurality of abrasive particles comprises cubic boron nitride (cBN) particles, alumina ($Al_2O_3$) particles, or combinations thereof.

10. An air seal comprising:
a gas turbine engine component according to claim 1; wherein the gas turbine engine component is rotatable relative to an engine axis; and
a complementary stationary turbine engine component including an abradable surface disposed on at least a portion of a corresponding sealing region or edge for sealing engagement with the sealing region or edge of the rotatable turbine engine component.

11. A method of coating a turbine engine component, the method comprising:
in a coating thickness direction, applying a first portion of an abrasive coating over at least one sealing region of the component to form an inner abrasive region having an inner portion of abrasive particles retained in an inner matrix;
in the coating thickness direction, applying a second portion of the abrasive coating to form an outer abrasive region, outward of the inner matrix region, the outer abrasive region having abrasive particles retained in an outer matrix;
during at least one of the applying steps, incorporating a first indicator material into at least one of the inner matrix and the outer matrix, at least one identifying aspect of the first indicator material corresponding to a thickness range of the abrasive coating being within the inner abrasive region or the outer abrasive region;
wherein the first indicator material has a chemical composition different from an inner matrix chemical composition, and an outer matrix chemical composition; and
wherein the first indicator material has a first concentration range in the inner abrasive region, and the first indicator material has a second concentration range in the outer abrasive region, the first concentration range different from the second concentration range such that inspecting an exposed abrasive surface during a useful life of the abrasive coating for the at least one identifying aspect indicates whether the exposed abrasive surface is within the inner abrasive region or the outer abrasive region.

12. The method of claim 11, wherein the step of incorporating the first indicator material is performed during only one of the applying steps such that presence or absence of the first indicator material on an exposed surface of the abrasive coating corresponds to the thickness range of the abrasive coating being within the inner abrasive region or the outer abrasive region.

13. The method of claim 11 and further comprising:
prior to applying the second portion of the abrasive material, applying at least a third portion of the abrasive material over the inner abrasive region to form at least one intermediate abrasive region between the inner and outer abrasive regions, the at least one intermediate abrasive region having abrasive particles retained in at least one intermediate matrix.

14. The method of claim 13 and further comprising:
modifying the at least one intermediate matrix with a second indicator material or a third, different concentration of the first indicator material, at least one aspect of the first or second indicator material corresponding to a thickness range of the abrasive coating being within the at least one intermediate abrasive region rather than the inner or outer abrasive region.

15. The method of claim 11, wherein at least one of the applying steps includes a cold spray process or a thermal spray process.

* * * * *